July 14, 1942.  J. G. VINCENT  2,289,470
MOTOR VEHICLE
Original Filed Dec. 7, 1936    2 Sheets-Sheet 1
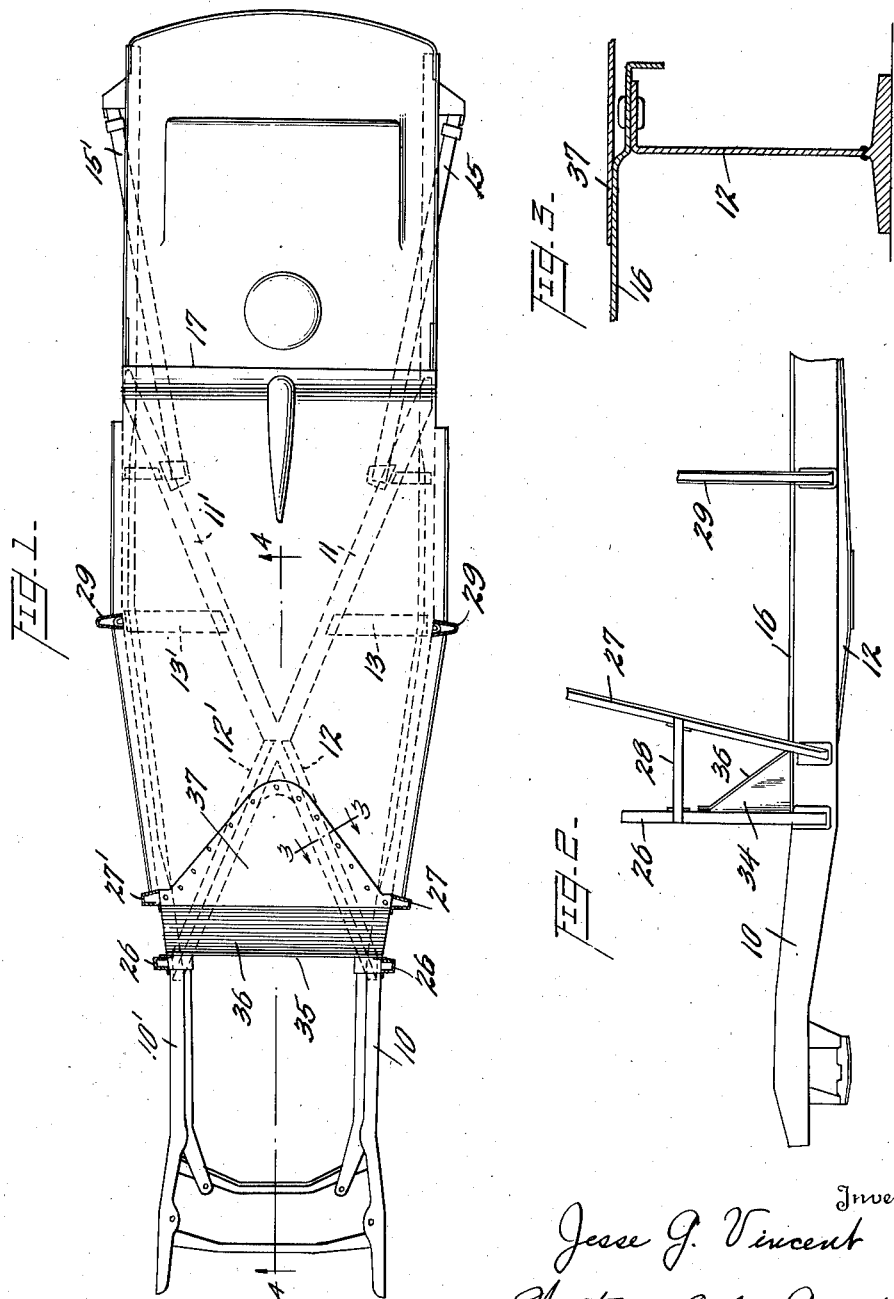
Inventor
Jesse G. Vincent
By Watson, Cole, Grindle
& Watson
Attorney July 14, 1942.     J. G. VINCENT     2,289,470
MOTOR VEHICLE
Original Filed Dec. 7, 1936     2 Sheets-Sheet 2
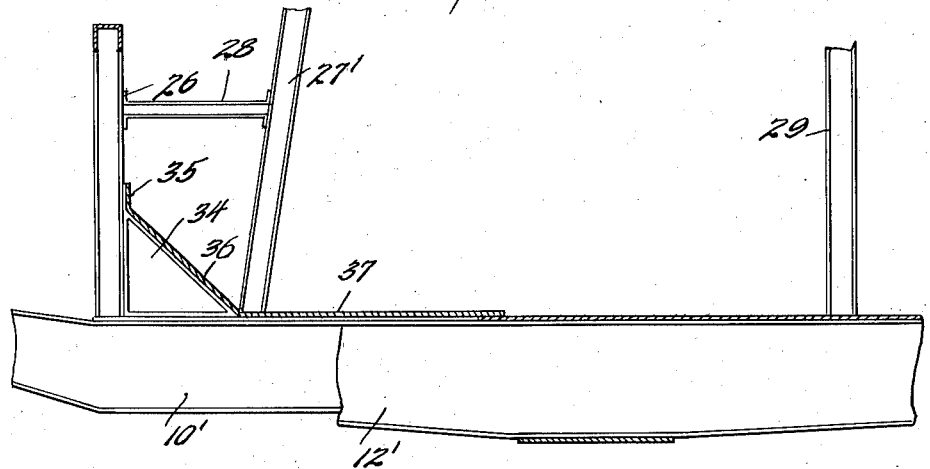
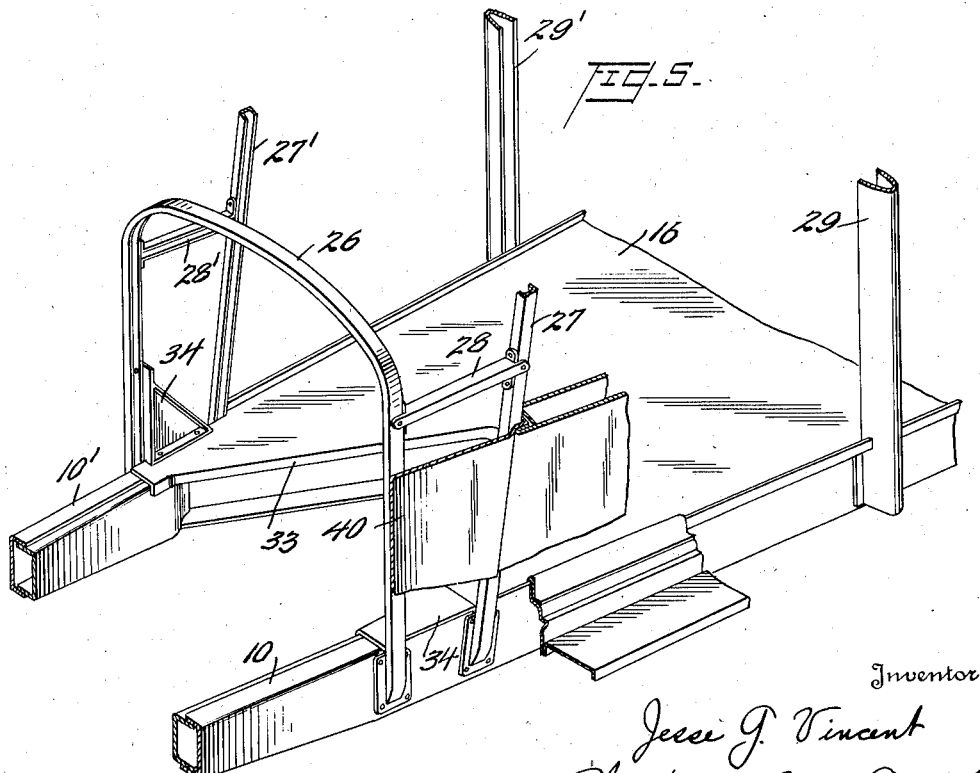
Inventor
Jesse G. Vincent
By Watson, Cole, Grindle
& Watson
Attorney Patented July 14, 1942

2,289,470

UNITED STATES PATENT OFFICE 2,289,470

MOTOR VEHICLE

Jesse G. Vincent, Grosse Pointe, Mich., assignor to Packard Motor Car Company, Detroit, Mich., a corporation of Michigan Original application December 7, 1936, Serial No. 114,692. Divided and this application June 21, 1939, Serial No. 280,413

1 Claim. (Cl. 296—28)

This invention relates to motor vehicles and particularly to the manner of uniting the body elements of a motor vehicle to the chassis thereof, and this application is a division of my application Serial No. 114,692, filed December 7, 1936, which matured as Patent No. 2,190,224, dated February 13, 1940.

The motor vehicle now in common use is composed of two entirely separate units, namely, the body and the chassis. Each of these units is assembled separately, the superpositioning of the body of the chassis being one of the final steps in the manufacture of the vehicle. One disadvantage of the present construction, in which the body is bolted to the chassis, is the fact that the body bolts must be tightened periodically in order to eliminate squeaks and maintain the necessary rigidity in the connection between the units. Another disadvantage is the fact that the body pillars are mounted on the body sills too far from the frame side members to assist materially the rigidity of the structure as a whole.

In the present method of construction, a shortened chassis frame or "body buck" is placed on the body assembly line and the body is then built up on this buck during its passage along the line. When the body has been completed and has reached the end of its assembly line, it is removed from the buck and transported to a point in another assembly line, where it is fitted on to a chassis which has been built up on that assembly line. The maintenance of two assembly lines, as stated, entails the use of a large amount of floor space, and one object of the present invention is to enable the chassis and body to be assembled as one unit rather than two, thus eliminating one assembly line.

In the present type of body construction, there is frequently a tendency for the cowl and windshield to vibrate laterally, due to the fact that the supporting structure for these members is anchored to the body sill at its weakest point. In the construction according to the present invention, the structure for the cowl is anchored to the frame at points where high rigidity is maintained. This feature will contribute much to cowl rigidity, particularly in convertible bodies which have always presented a problem in this respect.

From the standpoint of production, the proposed construction will enable large savings to be made, due to the reduction in the number of parts used and the reduction in floor space required. Also, a car constructed according to the present invention will be lighter in weight, and will possess much more rigidity than the present motor vehicles, thus ensuring greater safety, roadability and riding comfort.

The present invention has for its object the accomplishment of the foregoing advantages. A further object is the provision of a body construction in which the usual body sills are dispensed with, and a unitary floor member is secured directly on the chassis frame. Another object is the provision of a body structure in which the body pillars are secured directly to the side members of the chassis frame, the body panels being secured to the pillars and/or floor member.

Other and further objects, features and advantages will appear from the description which follows, together with the accompanying drawings, in which:

Figure 1 is a plan view of a chassis frame having a floor and body pillars secured thereto in accordance with the present invention;

Figure 2 is a side elevation of a portion of the structure of Figure 1;

Figure 3 is a vertical section on line 3—3 of Figure 1;

Figure 4 is a fragmentary vertical section on line 4—4 of Figure 1; and

Figure 5 is a perspective view of a portion of the structure illustrated in Figures 1 and 2.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to the drawings, the chassis frame illustrated comprises the usual side members 10 and 10', rigidly connected by cross members 11, 11' and 12, 12' arranged in X form. Bracing members 13 and 13' may be employed to enhance the rigidity of the frame structure. The side members 10, 10' are of channel section, the upper horizontal flange preferably being of less width than the lower flange. The cross members may be of any suitable section, such as the modified T section shown in Figure 3, having a relatively narrow horizontal upper flange.

Side members 10, 10' are curved upwardly adjacent their rear ends in the usual manner, to provide clearance for the conventional rear axle and associated mechanism, on which the frame is supported in the usual manner by leaf springs

15, 15'. A unitary metallic floor member 16 is secured, by rivets or other suitable means, directly to the chassis frame, being secured to the upper flanges of the cross members 11, 11' and 12, 12' and the upper flanges of the side members 10, 10' rearwardly to a pivot 17, somewhat in advance of the rear axle. At the point 17, which is located on the upward curve of the side members, the upper flanges of the side members terminate, the side members being of L section from point 17 rearwardly.

The supporting structure for the cowl and windshield comprises an inverted U-shaped member 26 and pillars 27, 27', all affixed to the side members 10 and 10' by rivets or other suitable means. Bracing members 28 and 28' connect the pillars 27 with the member 26, enhancing the rigidity of the cowl and windshield supporting structure. Main body pillars 29, 29' are secured directly to the side members 10 and 10' in a similar manner. The upper body panels may be welded or otherwise secured to the pillars and U-member 26 in the usual manner, a portion of the cowl panel being indicated at 40. It will be observed from Figure 5 of the drawings that each of the pillars 27 defines the forward side of the opening for the associated door.

The forward edge of the floor member 16 is of V-shape, corresponding to the forward end of the X frame comprised by cross members 12, 12' to which it is secured, and may be formed with a depending flange 33 (Figure 5). Triangle brackets 34, secured between the floor member 16 and U-member 26 enhance the rigidity of the latter member, and provide an inclined abutment for a toe board 35. The latter is formed with an inclined portion 36, which rests on the brackets 34, and a triangular horizontal portion 37 which overlies the V-shaped opening in the forward end of floor member 16, thus completing the floor of the forward compartment of the vehicle. The toe board 35 may be secured to the floor member 16 and brackets 34 in any suitable manner, as by screws, and may be divided, longitudinally of the vehicle, into two complementary members if desired.

It is contemplated that the chassis structure forward of the U-member 26 will be constructed in the usual manner, hence it is unnecessary to include detailed reference to such construction in the present description.

Having thus described the invention, what is claimed as new and desired to be secured by Letters Patent is:

In a motor vehicle, in combination, a combined cowl and chassis structure comprising chassis side frame members, a unitary inverted U-shaped member of channel section having the lowermost ends of its arms secured directly to said side members, a pair of pillar members spaced rearwardly of the U-shaped member and having their lower ends respectively secured directly to said channel side member, said U-shaped member and said pair of pillar members respectively lying in planes which are angularly disposed one with respect to the other, triangular bracing members each secured along one of its edges to one of said side frame members between said U-shaped member and said pillar member, and along another of its edges to one of the legs of said U-shaped member, a toe board spanning the space between said bracing members and secured at its side edges to the inclined third edge of said brace members, other bracing means extending between an upper portion of said U-shaped member and said pillar member and body panelling secured to the pillar and U-shaped members and comprising the cowl of the vehicle, all whereby there is provided a rigidly braced cowl structure for the vehicle.

JESSE G. VINCENT.